(12) United States Patent
Bauer et al.

(10) Patent No.: US 10,881,043 B2
(45) Date of Patent: Jan. 5, 2021

(54) METHOD FOR INCREASING THE LOAD ON DRIVING REAR WHEELS OF TRACTORS DURING SOIL CULTIVATION

(71) Applicant: Mendelova univerzita v Brne, Agronomicka fakulta, Ustav techniky a automobilove dopravy, Brno (CZ)

(72) Inventors: Frantisek Bauer, Brno (CZ); Jiri Cupera, Brno (CZ); Martin Fajman, Brno (CZ); Marek Zak, Brno (CZ); Adam Polcar, Policka (CZ)

(73) Assignee: MENDELOVA UNIVERZITA V BRNE. AGRONOMICKA FAKULTA, USTAV TECHNIKY A AUTOMOBILOVE DOPRAVY

( * ) Notice: Subject to any disclaimer, the term of this patent is extended or adjusted under 35 U.S.C. 154(b) by 141 days.

(21) Appl. No.: 16/196,110

(22) Filed: Nov. 20, 2018

(65) Prior Publication Data

US 2019/0150351 A1 May 23, 2019

(30) Foreign Application Priority Data

Nov. 20, 2017 (CZ) .................................... 2017-745

(51) Int. Cl.
*A01B 63/111* (2006.01)
*A01B 63/114* (2006.01)
(Continued)

(52) U.S. Cl.
CPC .......... *A01B 63/114* (2013.01); *A01B 59/066* (2013.01); *A01B 63/1006* (2013.01);
(Continued)

(58) Field of Classification Search
CPC ..... A01B 59/066; A01B 63/008; A01B 63/11; A01B 63/111; A01B 63/112; A01B 63/114; A01B 63/1145
(Continued)

(56) References Cited

U.S. PATENT DOCUMENTS 4,809,785 A    3/1989  Arnold et al. ..................... 172/9
6,076,612 A *  6/2000  Carr ..................... A01B 63/1117
                                                    172/7
(Continued)

FOREIGN PATENT DOCUMENTS

CS         136662 B6    5/1970
CS         236474 B2    3/1987
(Continued)

OTHER PUBLICATIONS

Search Report dated Aug. 20, 2018 issued in corresponding Czech Republic Patent Application No. PV 2017-745.
(Continued)

*Primary Examiner* — Gary S Hartmann
(74) *Attorney, Agent, or Firm* — Ostrolenk Faber LLP (57) ABSTRACT

A method for increasing the load on driving rear wheels (KB, KP) of a tractor during soil cultivation with a farm implement (2), attached to a three-point linkage (1) of the tractor. A vertical position of the attached implement (2, 20) is adjusted relative to the tractor by a position of the arms (4) of a lifting device and by adjustment of the length of the upper link (13) of the three-point linkage (1) of the tractor. After adjusting the length of the upper link (13), the axial force acting/induced in the upper link (13) is determined and during travel of the tractor is continuously monitored and automatically maintained at the adjusted value. Also the adjusted vertical position of the implement (2) attached to the tractor is continuously monitored (2) and is automatically maintained at the adjusted value, thereby maintaining the vertical position of the attached implement (3) in this regulation and thus also constant ploughing depth.

1 Claim, 5 Drawing Sheets

(51) Int. Cl.
  *B62D 49/06* (2006.01)
  *A01B 63/112* (2006.01)
  *A01B 59/06* (2006.01)
  *A01B 63/10* (2006.01)
  *A01B 76/00* (2006.01)

(52) U.S. Cl.
  CPC ............ *A01B 63/112* (2013.01); *A01B 76/00* (2013.01); *B62D 49/065* (2013.01); *B62D 49/0621* (2013.01)

(58) Field of Classification Search
  USPC ...................................................... 172/1, 4, 7
  See application file for complete search history.

(56) References Cited

U.S. PATENT DOCUMENTS

| | | | | |
|---|---|---|---|---|
| 6,119,786 | A * | 9/2000 | Creger | ................ A01B 63/1115 172/7 |
| 7,174,966 | B2 * | 2/2007 | Ollefs | ................... A01B 63/111 172/679 |
| 9,320,189 | B2 * | 4/2016 | Nance | .................... A01B 49/06 |
| 2005/0098330 | A1 | 5/2005 | Ollefs | ........................... 172/439 |
| 2008/0257569 | A1 * | 10/2008 | Foster | .................. A01B 63/145 172/9 |
| 2008/0257570 | A1 * | 10/2008 | Keplinger | ............ A01B 63/145 172/9 |

FOREIGN PATENT DOCUMENTS

| | | |
|---|---|---|
| CS | 249 585 B1 | 11/1988 |
| CS | 260531 B1 | 4/1989 |
| DE | 1557861 | 6/1970 |
| DE | 19945853 A1 | 3/2001 |
| EP | 1288506 A2 | 3/2003 |
| EP | 2 889 515 A1 | 7/2015 |
| WO | WO 2009/071253 A1 | 6/2009 |

OTHER PUBLICATIONS

Search Report dated Mar. 2, 2019 issued in corresponding European Patent Application No. EP 18 20 6953.

* cited by examiner

METHOD FOR INCREASING THE LOAD ON DRIVING REAR WHEELS OF TRACTORS DURING SOIL CULTIVATION

TECHNICAL FIELD

A method for increasing a load on driving rear wheels of a tractor during soil cultivation with a farm implement, in particular with a plough, attached to a three-point linkage of the tractor, in which the vertical position of the attached implement is adjusted relative to the tractor by positioning the arms of a lifting device and by adjusting the length of an upper link of the three-point linkage of the tractor.

A device for increasing the load on driving rear wheels of a tractor during soil cultivation with a farm implement, in particular with a plough, which comprises a three-point linkage of the tractor provided with a position sensor of the vertical position of the arms of a lifting device, whereby the upper link of the three-point linkage of the tractor is at least in part of its length formed by a double acting hydraulic cylinder.

BACKGROUND ART

One of the basic requirements for the economy and labour productivity of a farm tractor with an implement attached to the tractor is to achieve maximum adhesion force between the circumference of the tyre of the tractor driving rear wheel and the contact running area on which the tractor is moving. The maximum possible tractive force of the tractor that can be transferred by the driving wheel to the contact running area is limited by the adhesion conditions expressed by adhesion coefficient, which is the ratio between the force on the wheel circumference and the adhesion weight, i.e. the normal force between the wheel circumference and the contact running area. For example, when ploughing with a one-sided plough, the running area for the right-hand rear wheel is the furrow bottom and for the left-hand rear wheel it is the unploughed ground. When using a rotary plough, the plough works in such a manner that in one direction between the headlands one half of the plough bodies plough the soil, the other half of the plough bodies are carried above the unploughed soil. In the opposite direction of travel, the functions of the plough bodies change. This means that the right-hand wheels in one direction run in the furrow, while the left-hand wheels of the tractor run in the furrow when travelling in the other direction.

During ploughing with a plough or another implement being carried or semimounted, part of the weight of the implement, as well as the forces and moments are transferred from the plough to the rear wheels of the tractor. It is a spatial system of forces and moments, resulting in normal force acting between the soil and the circumference of the driving wheels of the tractor. In terms of the transfer of the driving forces from the tractor wheels to the soil, the normal forces should be as high as possible. This is, however, in contradiction with undesirable soil compaction. Especially the wheel moving in the furrow is loaded with greater normal force than the wheel moving on the ground, which as a rule leads to undesirable subsoil compaction.

In ploughing operations with the so-called force regulation of the hydraulic system of the three-point linkage, with increasing soil resistance, the lifting arms of the lifting device with the plough attached to the tractor are lifted, thereby lifting the plough and decreasing the ploughing depth. At the same time, the load on the rear wheels is momentarily increased, which results in an increase in adhesive force. The decrease in soil resistance, on the contrary, causes the plough to go deeper. In terms of utilization of the motor performance, the force regulation of the ploughing depth is therefore advantageous. In terms of agrotechnical requirements, variations in the ploughing depth is a disadvantage. In the case of using one-sided ploughs, another negative consequence is constantly unbalanced higher load on the right-hand side of the drive, which leads to its faster wear.

Document CS249585B1 discloses a solution which has a hydraulic cylinder inserted in an upper link of a three-point linkage which is used to facilitate the lifting of the implement, for example before cleaning it by removing stuck clay. The cylinder is included in the external hydraulic circuit of the tractor and is connected to the outlets of this circuit and the control of the position of the three-point linkage is carried out by the driver only manually by using a special control lever. The cylinder is not part of a system of automatic regulation of the three-point linkage. During ploughing, the implement freely vertically swings, depending on the unevenness of the terrain, upward and downward, since there is no pressure in the hydraulic cylinder and therefore the implement is unable to increase the load on the rear axle.

U.S. Pat. No. 4,809,785 describes an arrangement of a tractor with a plough, which monitors the tractive force between the tractor and the plough and in which the vertical position of the plough attached to the tractor is controlled according to the tractive force. This is, therefore, a modification of the well-known force regulation, in which the load on the rear drive axle of the tractor is increased, but the result of this process is in most cases undesirable variation in the ploughing depth.

The solution according to CS260531B1 is used to "automatically lift and lower trailed ploughs" by means of hydraulic cylinders which change the vertical position of the arms of the three-point linkage of the tractor relative to the tractor. The regulation results in changes in the ploughing depth to prevent overloading of the rear axle of the tractor, slippage of the rear wheels, the rear axle load and the deformation of the tyres. With unwanted increase in these quantities, the plough automatically rises, reducing the ploughing depth. This is a well-known principle of the so-called force regulation of three-point linkage, in which the tractor operates with a constant set optimal performance, but at the cost of the ploughing depth variations depending on the soil resistance.

The aim of the invention is to eliminate or at least reduce the drawbacks of the background art, particularly to eliminate ploughing depth variations and at the same time to increase the rear drive axle of the tractor and achieve uniform load distribution between the rear wheels of the tractor. With the load being distributed equally between the rear wheels of the tractor, the wheels also transfer equal tractive force.

Principle of the Invention

The aim of the invention is achieved by a method for increasing the load on driving rear wheels of a tractor during soil cultivation with a farm implement, in particular with a plough connected to a three-point linkage of the tractor, whose principle consists in that after adjusting the length of the upper link of the three-point linkage of the tractor, the axial force acting/induced in the upper link is determined and during the tractor travel, this force is continuously monitored and the adjusted value is automatically maintained, whereby also the adjusted vertical position of the attached implement is continuously monitored, which is also automatically constantly maintained at the adjusted value, thereby maintaining in this regulation the vertical position of the implement attached to the tractor and, consequently, also maintaining constant ploughing depth.

If the axial tractive force in the upper link of the three-point linkage of the tractor decreases, it increases automatically due to the hydrostatic force acting in the direction of shortening the length of the upper link of the three-point linkage of the tractor, whereby after increasing the axial tractive force in the upper link of the three-point linkage, the hydrostatic force is maintained or it is again reduced.

The center of gravity of the plough lies relative to the tractor's longitudinal axis in the opposite half-plane than the tractor rear wheel moving in the furrow. When the axial force in the upper link increases to a value at which the support ground wheel of the plough is relieved, a tilting moment arises relative to the tractor's longitudinal axis. The tilting moment increases the load on the rear wheel of the tractor moving on unploughed ground and relieves the tractor wheel running in the furrow. Consequently, the pressure of the tractor rear wheels on the ground is equal or differs only slightly. This is very important because in this manner the normal force between the rear wheel and the furrow bottom decreases as desired, which results in reducing subsoil compaction. This also contributes to balancing the load of the right-hand and left-hand halves of the drive system of the tractor and to even wear of the components of the drive.

The goal of the invention is also achieved by a device for increasing the load on driving rear wheels of a tractor during soil cultivation with a farm implement, which comprises a three-point linkage of the tractor, whose upper link is at least in part of its length formed by a double acting hydraulic cylinder, the device being provided with a position sensor of the vertical position of the arms of a lifting device. The principle of the device is that the double acting hydraulic cylinder is through the space above the piston and through the space under the piston connected to a control hydraulic distributor and through it to the output of the hydrogenerator and to a working fluid reservoir, whereby the control hydraulic distributor for the purpose of control is coupled to a control unit, to whose inputs are connected the output of a means for monitoring the axial force in the upper link of the three-point linkage of the tractor and the output of the position sensor of the vertical position of the arms of the lifting device of the three-point linkage.

The means for monitoring the axial force in the upper link of the three-point linkage of the tractor is a force sensor which is preferably arranged between a free end of a piston rod of the double acting hydraulic cylinder and a rear face of the tractor gearbox.

In an alternative embodiment, the means for monitoring the axial force in the upper link of the three-point linkage of the tractor are formed by pressure sensors connected to oil spaces of the double acting hydraulic cylinder which is inserted in the upper link of the three-point linkage.

Alternatively, the end of the upper link of the three-point linkage of the tractor with the upper attachment point of the implement is connected freely slidably in the direction of the tractor's longitudinal axis. In this case, a connecting pin can freely move within a groove. By mechanically adjusting the length of the upper link within the groove, the upper link is not loaded with axial force. After determining the clearance between the connecting pin and the end of the groove, the regulation of the tractive axial force in the upper link regulates the normal forces between the rear wheels and the contact running area in order to minimize the compaction of the furrow bottom, i.e. the subsoil.

DESCRIPTION OF THE DRAWINGS

The device according to the invention increasing the load on driving rear wheels of a tractor during soil cultivation with an implement is shown in the drawing, in which.

EXAMPLES OF EMBODIMENT

A known three-point linkage 1 of a tractor is used to attach a farm implement 2, which can be at least partially carried by the tractor by means of the linkage, so that part of the weight of the implement can be transferred to the tractor, thereby increasing the normal force between the circumference of the rear wheel and the ground on which the tractor with the implement moves.

Figure 1:
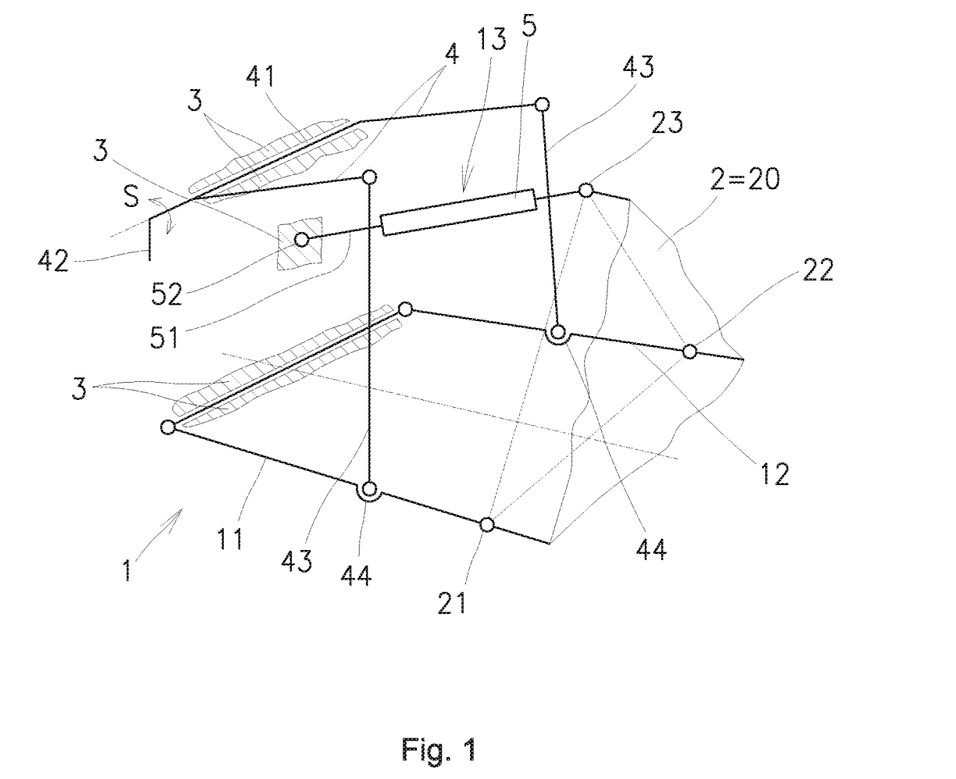
FIG. 1 is a schematic oblique view of a three-point linkage of a tractor with an implement attached to the tractor.
Figure 2:
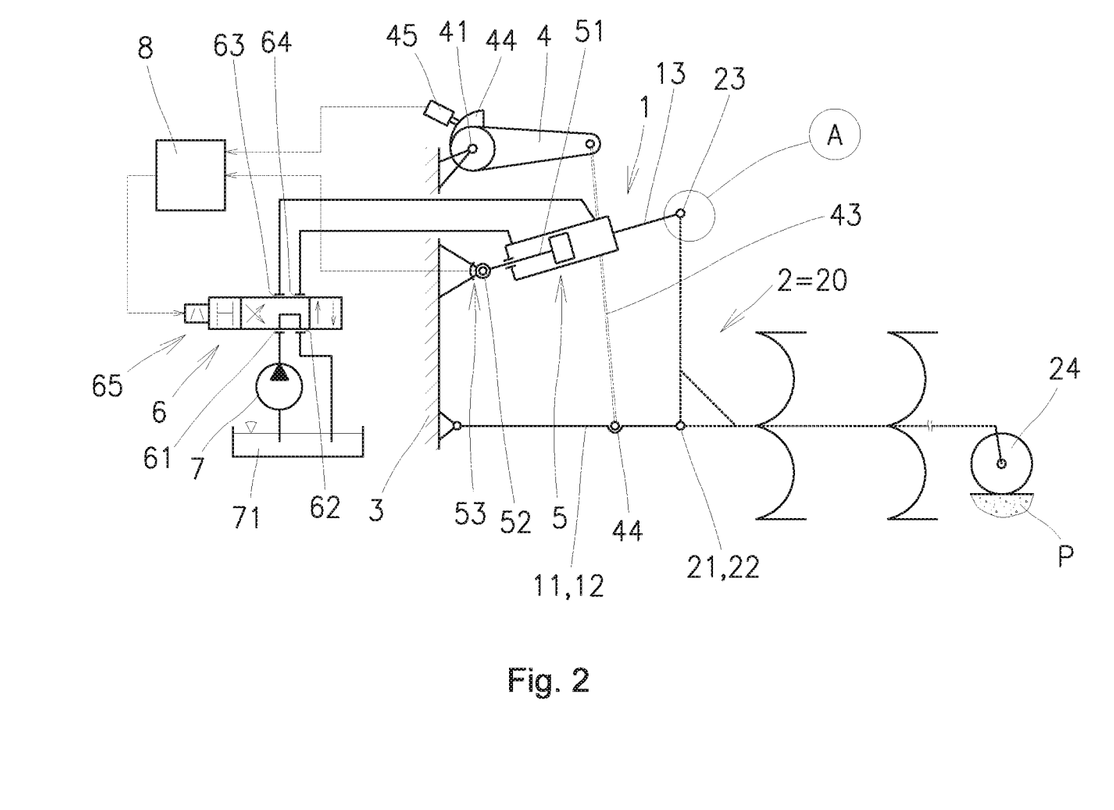
FIG. 2 is a schematic side view of the three-point linkage of the tractor with the implement attached and of the adjoining part of the hydraulic system of the tractor coupled to an upper link of the three-point linkage.

The three-point linkage 1 of FIG. 1 comprises a left-hand lower link 11, a right-hand lower link 12 and an upper link 13. The links 11, 12, 13 are hingedly connected to a rigid rear part of the tractor in the area of a rear face of a gearbox 3, indicated here by the hatched areas. Connected to the rear ends of the links 11, 12, 13 is the front face of the implement 2, whose attachment points 21, 22, 23 constitute a vertical mounting post. In an exemplary embodiment, the implement is 2 a two-way rotary plough 20 equipped with a support ground wheel 24 (FIG. 2). Such ploughs have two parallel rows of plough bodies, one of which is currently ploughed in the ground, and the other is rotated by 180° relative to the longitudinal axis of these rows. This defines a high weight of the plough 20, the center G of the gravity of the plough 20 lies relative to the longitudinal axis OS of the tractor in the opposite half-plane than the rear wheel KB of the tractor running in the furrow B (see FIGS. 4 and 5).

The height position of the three-point linkage 1, or, more specifically, the ends of the links 11, 12, 13 with the attached implement is controlled by the hydraulic system of the tractor by means of the arms 4 of a lifting device, whose front ends are in the exemplary embodiment inside the gearbox 3 connected to a shaft 41. The shaft 41 is rotated in the direction of the arrow S, for example by an unillustrated hydraulic cylinder whose piston acts on the shaft 41 through a lever 42. The ends of the arms 4 of the lifting device are connected by lifting links 43 with lower links 11, 12 by hinges 44.

The upper link 13 of the three-point linkage 1 of the tractor is adjustable in length. For background art tractors, the length of the upper link is most often adjusted by a motion thread, for example before ploughing. By changing the length of the upper link 13 the end of the upper link 13 which is connected to the upper attachment point 23 of the implement 2 is moved along a circle with respect to the lower attachment points 21, 22 of the implement 2. Upon extension of the upper link 13 the longitudinal axis of the implement 2, which in the exemplary embodiment described the plough 20, is inclined backward, "to the heel", so to speak, whereas when the upper link 13 is shortened, the longitudinal axis of the implement 2 moves forward, "to the tip." This is related to the correct spatial adjustment of, for example, the plough 20 before starting the work according to the current conditions of the ploughing operation. In an embodiment of the present invention, the upper link 13 of the three-point linkage comprises in addition to an unillustrated device for mechanical adjustment of its length, a double acting hydraulic cylinder 5 which is coaxially inserted into the upper link 13. The piston rod 51 of the cylinder 5 is directed to the tractor, its end being mounted in a case 52 by means of the force sensor 53, sensing the substantially axial force in the piston rod 51.

Figure 3:
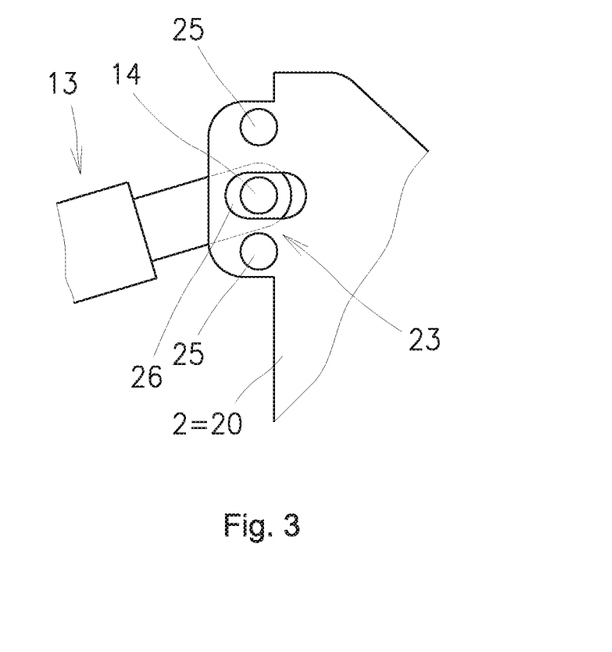
FIG. 3 shows a detail A of FIG. 2, wherein the upper link of the three-point linkage of the tractor is connected to the front face of the working machine with a clearance in horizontal direction of travel of the tractor with the working machine

In an alternative embodiment of FIG. 3, which is a detail A of FIG. 2, the upper link 13 is attached to the front face of the implement 2 with a clearance in horizontal direction of the tractor travel. In the exemplary embodiment, in the area of the attachment of the upper link 13 to the implement 2 by means of a pin 14 in the upper part of the front face of the implement 2 there are two circular openings 25 and, in addition, horizontally at the ends there is a rounded groove 26, in which the pin 14 can alternatively be mounted. In this case, the pin 14 can freely move within the groove 26. At a predetermined mechanical length of the upper link 13 the upper link 13 is not loaded with axial force within the groove 26. In an unillustrated embodiment, apart from the groove 26, there is only one circular opening 25 in the upper part of the front face of the implement 2.

Figure 4:
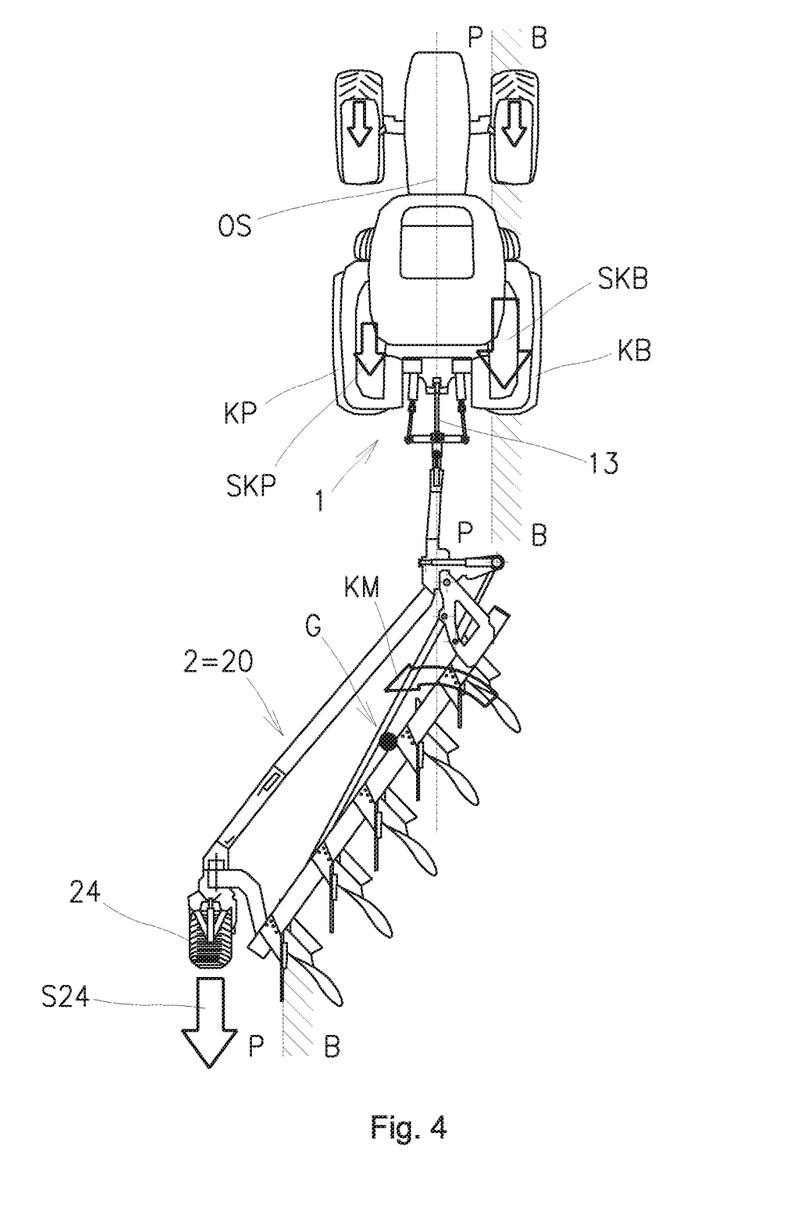
FIGS. 4 and 5 show a top view of the tractor with a plough schematically depicting the different loads on the driving wheels of the rear axle of the tractor.

FIG. 4 schematically represents the ratio between the normal forces by which the rear wheels KB, KP of the tractor and the support ground wheel 24 of the plough 20 act on the soil when the pin 14 connecting the upper link 13 of the three-point linkage 1 of the tractor to the plough 20 is not in contact with one or the other end of the groove 26 of the upper attachment point 23 of the plough 20. In this situation, the upper link 13 of the three-point linkage 1 is not loaded by axial force and the support ground wheel 24 of the plough acts on the uploughed ground by a relatively great normal force S24 induced by the weight of the plough and the vertical force component due to soil resistance. The tilting moment KM by which the plough 20 acts on the tractor relative to the longitudinal axis OS of the tractor is small. The left-hand rear wheel KP acts on the uploughed ground by the normal force SKP and the right-hand rear wheel KB acts on the furrow bottom by the normal force SKB. The force SKB is in this situation substantially greater than the normal force SKP, causing undesirable subsoil compaction under the wheel KB running in the furrow.

Upon mechanical shortening of the upper link 13 the pin 14 abuts the rounded end of the groove 26 facing the tractor. This results in loading the upper link 13 with tractive force. By mechanically shortening the upper link 13 this tractive force increases. By adjusting the appropriate size of the tractive force in the upper link 5 of the three-point linkage 1 of the tractor, the support ground wheel 24 of the plough, which now acts on the unploughed soil by the normal force S24", is noticeably smaller than the normal force S24.

Figure 5:
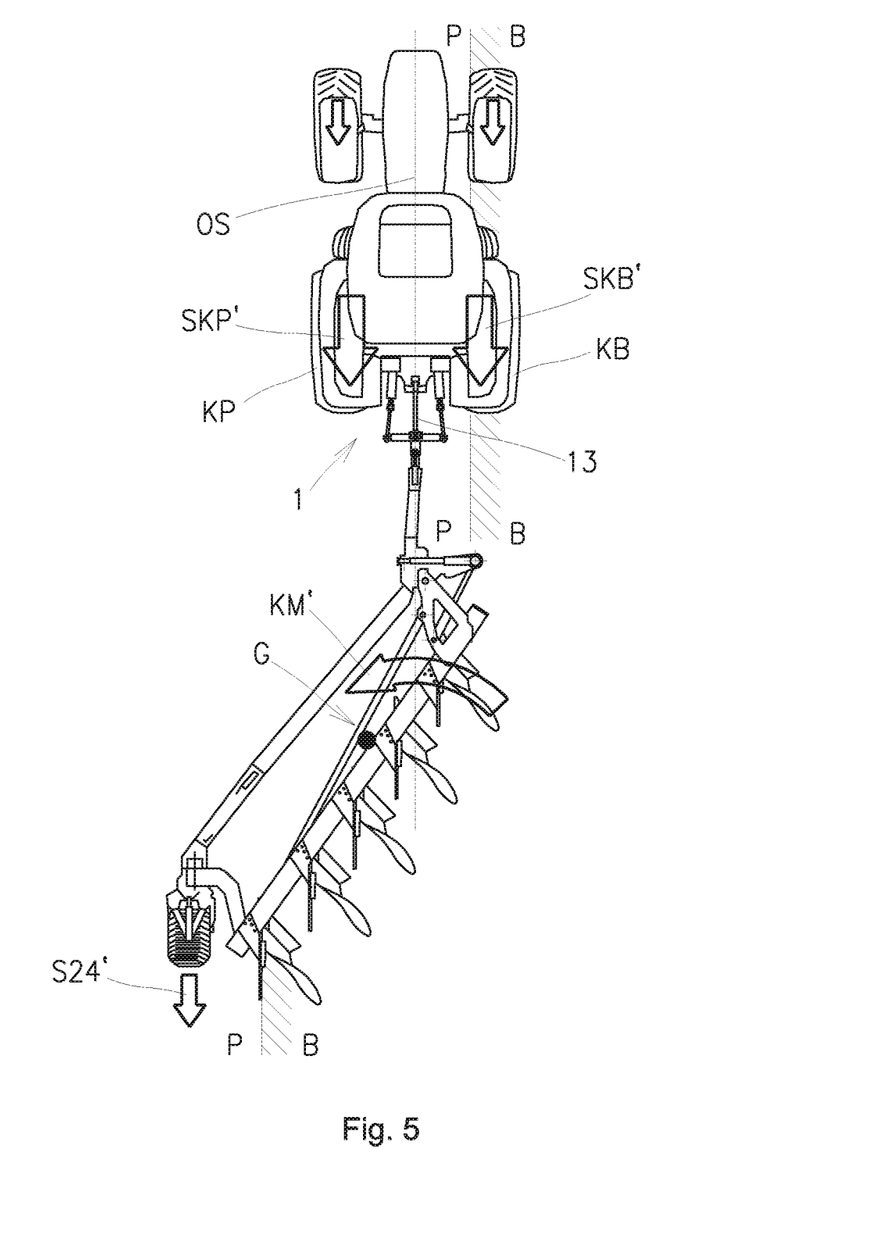

This situation is shown in FIG. 5. Since the centre of gravity G of the plough is located at a distance at the left side of the longitudinal axis OS of the tractor, a great tilting moment KM" arises relative to the longitudinal axis OS of the tractor, relieving the rear wheel KB of the tractor running in the furrow B and loading the rear wheel KP of the tractor moving in the unploughed field P. Both rear wheels KB, KP of the tractor can act on the soil by substantially identical normal forces SKP', SKB'. Changing the length of the upper link 13 does not affect the longitudinal parallelism of the frame of the implement 2 with the soil surface, hence the ploughing depth is not affected either, due to the flexibility of the frame of the implement 2.

The double acting hydraulic cylinder 5 is connected to a four-way four-position valve 6 connected in the basic state shown in FIG. 2 through an inlet port 61 to the output of a hydrogenerator 7, through a reversible inlet port 62 to a reservoir 71, through an linlet port 63 to the cylinder 5 compartment above the piston and through the inlet port 64 to the cylinder 5 compartment under the piston through which the piston rod 51 passes.

The shaft 41 of the arms 4 of the lifting device of the three-point linkage 1 is connected to a rotary cam 44 coupled to a position sensor 45.

The outputs of the position sensor 45 and of the force sensor 53 are connected to the inputs of a control unit 8, the output of which is connected to a control means 65 of the four-way four-position valve 6.

The resulting force applied to the three-point linkage 1 of the tractor at work is the vector sum of the virtually horizontal force given by the soil resistance and the vertical force given by the weight of the attached implement 2. Assuming that the resulting force direction passes above the connecting line of the attachment points 21, 22 of the implement 2 to the lower links 11, 12, which is common in multi-share ploughs due to their high weight, there is traction in the lower links 11, 12 as well as in the upper link 13.

When requesting a specific ploughing depth in the soil which has a specific soil resistance, the axial force in the upper link 13 of the three-point linkage 1 is determined by the force sensor 53 arranged in the case 52, by which the front end of the upper link 13 is hingedly connected to the front of the gearbox 3 of the tractor. The determination of the axial force in the upper link 13 of the three-point linkage 1 is in an unillustrated embodiment realized by pressure sensors connected to the oil spaces of the double acting hydraulic cylinder 5 inserted in the upper link 13 of the three-point linkage 1. The oil pressure is substantially proportional to the required ploughing depth. The axial force determined in the upper link 13 by the force sensor 53 or by means of the pressure sensors connected to the oil spaces of the double acting hydraulic cylinder 5 is stored in the control unit 8 and at the same time the value of the position sensor 45 is adjusted to the desired corresponding ploughing depth.

During ploughing, variations in soil resistance usually occur. The decrease in soil resistance is reflected by a reduction in the traction between the tractor and the plough, thereby changing the oil pressure under the piston rod 5 and/or axial force sensed by the force sensor 53. The control unit 8 moves the valve 6 to a position in which the inlet port 64 of the supply is connected to the space under the piston of the cylinder 5. Even with a small minor decrease in the lifting arms 4 of the lifting device of the three-point linkage 1, the oil supply begins to the space under the piston of the cylinder 5. Since the position sensor 45 does not allow lifting the arms 4 of the lifting device above the adjusted value, the only outcome is a pressure impulse in the direction of shortening the upper link 13 of the three-point linkage 1, which manifests itself by increasing the load of the rear axle of the tractor. At the same time, the arms 4 of the lifting device do not change their position and the adjusted ploughing depth remains unchanged.

Using the known force regulation as described in the background art, the tractive force is maintained constant by changing the ploughing depth depending on the soil resistance and, as a result, the performance of the tractor is also constant. Using mixed regulation, the depth changes caused by changes in soil resistance are corrected by a position signal. In this case, the depth changes are smaller than "pure" force regulation. On the other hand, the device according to the invention makes it possible to increase the load on the rear axle of the tractor without changing the vertical position of the three-point linkage 1, practically without changing the ploughing depth.

As mentioned above, with greater mechanic shortening of the upper link 13, the tractive force in it further increases, thereby relieving the support ground wheel 44 of the plough 20. The tilting moment KM″, which, due to the off-axis position of the center of gravity G of the plough 20 arises, relieves the rear wheel KB of the tractor running in the furrow B, whereas it applies a load on the rear wheel KP of the tractor running in the unploughed field P. The normal forces acting between the rear wheels KB, KP of the tractor and the respective running surfaces of the tractor are practically aligned. A positive consequence of the solution according to the invention is balancing the load of the left-hand and right-hand sides of the drive system of the tractor and therefore their wear is even. Moreover, there is a smaller subsoil compaction, which normally occurs at the high vertical forces applied by the rear wheel KB running in the furrow B.

LIST OF REFERENCES 1 three-point linkage of the tractor
11 left-hand lower link (of the three-point linkage of the tractor)
12 right-hand lower link (of the three-point linkage of the tractor)
13 the upper link (of the three-point linkage of the tractor)
14 pin (for connecting the upper link of the linkage to the working machine)
2 implement (atttached to the tractor)
20 plough
21 left-hand lower attachment point (of the working machine)
22 right-hand lower attachment point (of the working machine)
23 upper attachment point (of the working machine)
24 support ground wheel of the working machine
25 circular opening (possible to attach the upper link of of the three-point linkage to the working machine)
26 groove (suitable to attach the upper link of the three-point linkage to the working machine)
3 rear face of the gearbox of the tractor
4 arms of the lifting device (of the three-point linkage of the tractor)
41 shaft of the arms of the lifting device
42 lever (of the shaft of the arms of the lifting device)
43 lifting link (connecting the arms of the lifting device to the lower links)
44 hinge (connecting the lifting links to the lower links)
45 position sensor
5 double acting hydraulic cylinder (part of the upper link of the three-point linkage)
51 piston rod (of the double acting hydraulic cylinder)
52 case (for the force sensor)
53 force sensor
6 operating valve (of the double acting cylinder 5)
61 inlet port (of the operating valve)
62 reversible inlet port (of the operating valve)
63 inlet port (to the cylinder compartment under the piston)
64 inlet port (to the cylinder compartment above the piston)
7 hydrogenerator
8 control unit
B furrow
G center of gravity of the plough
KB rear wheel of the tractor running in the furrow
KM tilting moment transferred to the support wheel of the plough (background art)
KM′ tilting moment transferred to the support wheel of the plough (according to the invention)
SKB normal force of wheel KB (background art)
SKB′ normal force of wheel KB (according to the invention)
KP rear wheel of the tractor moving in the uploughed field
SKP normal force of wheel KP (background art)
SKP′ normal force of wheel KP (according to the invention)
OS tractor's longitudinal axis
P unploughed field
S arrow (of the direction of rotation of the shaft of the arms of the lifting device)

The invention claimed is:

1. A method for increasing a load on driving rear wheels of a tractor during soil cultivation performed by using an implement configured and operable for the soil cultivation, the method comprising:
  connecting the implement to a three point linkage of the tractor, wherein the three point linkage includes an upper link having an adjustable length;
  adjusting the vertical position of the implement by positioning arms of a lifting device,
  adjusting the length of the upper link for inducing an axial force in the upper link;
  after the axial force in the upper link is induced, determining the axial force by a force sensor having an output connected to an input of a control unit, or determining the axial force in the upper link by a pressure sensor connected to a double acting hydraulic cylinder located in the upper link, and storing the axial force thus determined in the control unit, wherein the determining of the axial force is occurring at the same time as a value of a position sensor is adjusted to a selected ploughing depth for the implement, and connecting the output of the position sensor to the input of the control unit;
  coupling the position sensor to a rotary cam which is connected to a shaft of an arm of the lifting device,
  whereby while the tractor is traveling, the axial force induced in the upper link is constantly monitored and automatically maintained at an adjusted value, thereby adjusting the vertical position of the implement attached to the tractor, which is constantly monitored and automatically maintained at the adjusted value;
  wherein a decrease in soil resistance causes a reduction of traction between the tractor and the implement for causing changing of the pressure in the hydraulic cylinder on the upper link and/or of the axial force sensed by the force sensor for causing the control unit to supply the hydraulic cylinder, and the positioning sensor does not permit the lifting device arms to lift above an adjusted value, thereby causing a pressure impulse directed for shortening the upper link, for increasing a load on a rear axle of the tractor for maintaining a constant ploughing depth.

* * * * *